Feb. 14, 1956  R. VOGT  2,734,704
CONTROL FOR REDUCING AIR LOADS ON WINGS
Filed April 1, 1952  3 Sheets-Sheet 1
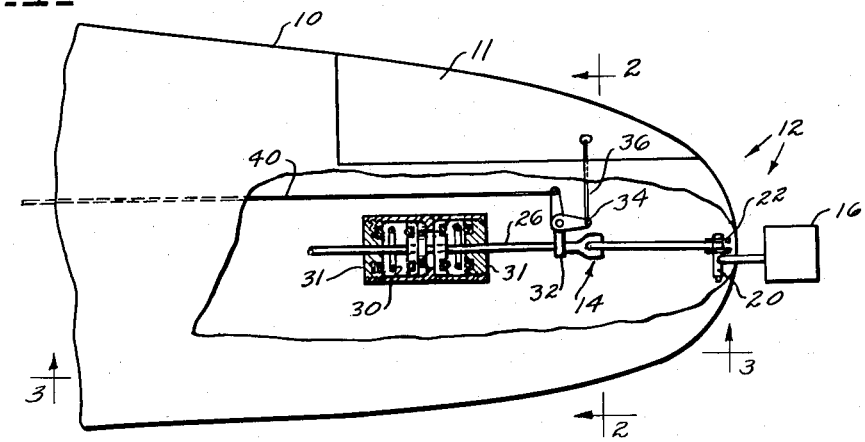
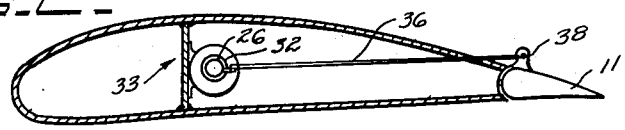
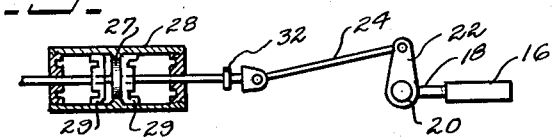
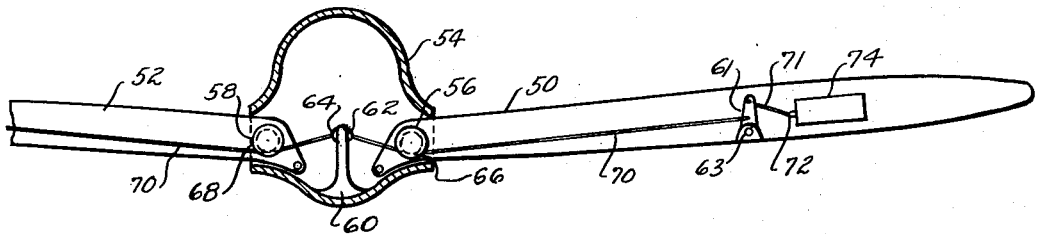
INVENTOR.
RICHARD VOGT
BY Maurice H. Klitzman
AGENT
Wade Kouts AND
ATTORNEY Feb. 14, 1956 R. VOGT 2,734,704
CONTROL FOR REDUCING AIR LOADS ON WINGS
Filed April 1, 1952 3 Sheets-Sheet 3

INVENTOR.
RICHARD VOGT
BY Maurice H. Klitzman
AGENT
Wade Lovity AND
ATTORNEY

United States Patent Office 2,734,704
Patented Feb. 14, 1956

2,734,704
CONTROL FOR REDUCING AIR LOADS ON WINGS

Richard Vogt, Medway, Ohio

Application April 1, 1952, Serial No. 279,905

2 Claims. (Cl. 244—82)

(Granted under Title 35, U. S. Code (1952), sec. 266)

The invention described in the following specification and claims may be manufactured and used by or for the Government for governmental purposes, without the payment to me of any royalty thereon.

This invention relates to a method for reducing the weight of airplane wings by reducing the bending moments on the wings and to offset gust loads on the wings. This is accomplished by automatically making the ailerons respond negatively to an increase in the angle of attack which causes the increase in bending moments on the wings.

The basic idea of this invention consists in detecting the increase of airloading on the wing and to translate this increase into a movement of the ailerons to offset the increase of the airloading on the outer portion of the wing. In this way the center of the lift will shift inwardly, thereby decidedly reducing the bending moments.

A sudden gust of air or an extended maneuver results in an increase of air loading on an aircraft wing. The increase in bending moments therefore increases the load factor necessary in designing the wing. The wing spar makes up the greater structural weight of the wing so that a decrease in the bending moments on the wing can result in a decrease in the weight of the wing spar. It is therefore an object of this invention to decrease the bending moments on the aircraft wing and thereby decrease the weight of the airplane wings.

When an upward gust of wind hits the wings, the increase in the bending moment will tend to make the wings bend. An electrical or mechanical detecting device for converting this deflection to an auxiliary aileron control and then to the aileron is provided so that the aileron will move in a direction to reduce the air loads on the wings. Another object of this invention therefore is to provide a method of detecting the accelerations due to air load changes on the wings.

These and other objects will become apparent from the accompanying specification and drawings wherein like parts refer to like numbers and wherein:

Fig. 1 is a broken plan view showing an airfoil and auxiliary aileron control.

Fig. 2 is a cross view taken on line 2—2 of Fig. 1 showing the connection to the aileron.

Fig. 3 is a front view taken along line 3—3 of Fig. 1 showing the detecting device.

Fig. 4 is a front view of an airplane showing another embodiment of the invention.

Figure 5:
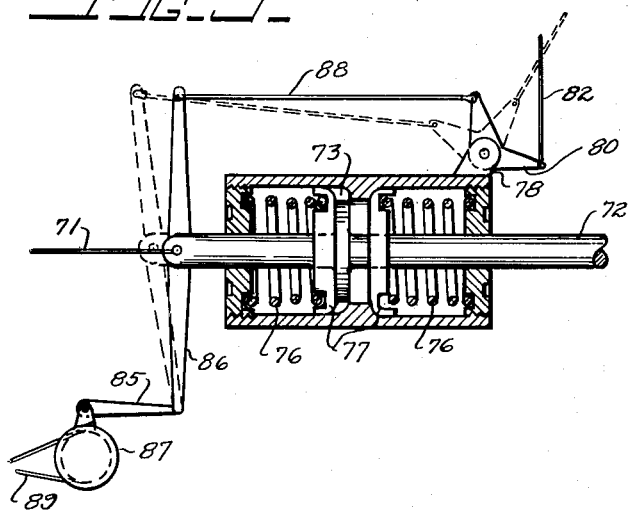
Fig. 5 shows the piston and cylinder arrangement of Fig. 4 with the aileron and auxiliary controls.

Referring to Figs. 1–3, 10 is an aircraft wing with an aileron 11 pivotally mounted thereon, said wing having mounted thereon an air-load detecting device generally designated as 12 and an auxiliary aileron control generally designated as 14 connected to the detecting device 12. The airload detecting device 12 comprises an auxiliary airfoil section 16 on an arm 18 extending outwardly in a spanwise direction of the aircraft wing 10. The airfoil can extend in front of the wing instead of spanwise. Said arm 18 is fixedly mounted to a rod 20 pivotally mounted in the aircraft wing 10. The auxiliary aileron control 14 comprises an arm 22 fixed to said rod 20, and having a link 24 pivotally connected to said arm 22. The other end of said link 24 is pivotally connected to a piston rod 26. Said piston rod 26 having a piston 27 fixed thereon extends through both ends of cylinder 28 to keep the piston rod and cylinder in alignment and is normally held in an extended position by coil springs 30 biased against pistons 29, slidably mounted on piston rod 26 and cylinder heads 31 in said cylinder 28. Said cylinder 28 is rigidly secured to the aircraft structure at 33. A bracket 32 extending from said piston rod 26 pivotally carries a bell crank 34. A link 36 is pivotally connected to said bell crank at one end, and is pivotally connected to a bracket 38 on the aileron 11 at the other end. The normal aileron control system comprises a control rod 40 pivotally connected at the other end of the bell crank 34 for normally operating the aileron.

In operation a gust of wind on the airfoil 16 will force the airfoil in an upward direction, which will pivot the arm 22 in a counterclockwise direction, and which will in turn force the link 24 and piston 26 inwardly so that piston 27 will engage piston 29 compressing the spring 30. Since the pilot will normally be holding the stick steady for the normal aileron control, the bell crank 34 will assume a new position which will tend to exert a pull on the link 36 and pivot the aileron in an upward direction. This upward movement of the aileron 12 will reduce the lift and partly or fully offset the force due to the gust of wind on the wing 10. The coil springs 30 will tend to maintain the airfoil 16 in a neutral position until the airload on the airfoil exceeds a predetermined value. Also, the normal aileron control may be operated independently of the auxiliary aileron control since the springs are sufficiently stiff as not to give while the normal aileron control is in use.

Figure 6:
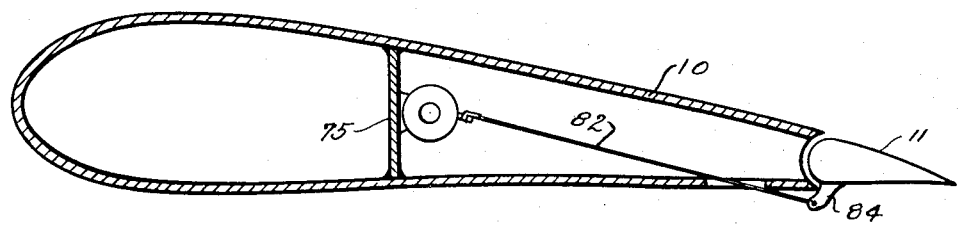
Fig. 6 is a cross section view of the wing of Fig. 4 showing the device connected to the aileron.

Referring to the modification shown in Figs. 4–6 the wings 50 and 52 are mounted in the fuselage 54 at 56 and 58. A central member 60 is mounted in the fuselage 54 to which is connected a cable 70 at each side at 62 and 64. The cable 70 is wound around pulleys 66 and 68, the pulleys being pivotally mounted at 56 and 58. Said cable 70 is connected to an arm 61 which is pivotally mounted in the wing 50 at 63. A cable 71 is connected to the arm 61 and piston rod 72. The arm arrangement amplifies the shortening of the cable 70 so as to give greater movement to the piston rod 72. Said piston rod 72, having an integral piston 73, is mounted in a cylinder 74 securely mounted to the aircraft structure in the airplane at 75. Springs 76 tend to hold piston 73 and the pistons 77 in the cylinder 74 in a neutral position since they are slidably mounted on the piston rod 72. Figure 5 shows the piston 73 in a partially operative position. A bracket 78 mounted on said cylinder 74 carries a bell crank 80 which has a link 82 pivotally connected thereto. A bracket 84 fixedly mounted on said aileron 11 is pivotally connected to said link 82. The normal aileron control comprises a link 86 pivotally connected to said piston rod 72, and one end of link 88 pivotally connected to said link 86. The other end of said link 88 is in turn pivotally connected to one end of the bell crank 80. The link 86 is pivotally connected to control rod 85 which is in turn pivotally connected to the pulley 87. The pulley 87 is operated by the normal aileron control cable 89.

In this modification the whole aircraft wing becomes a detecting device so that an increase in air loading, for example, in an upward direction will tend to pivot the wing 50 about 56. In view of this angular deflection of the wing, cable 70 will shorten because of moving around pulley 66, thereby pulling on the arm 61 and cable 71 against the spring 76. Since the pilot will be holding the stick steady, the piston 72 and link 86 will assume the positions shown in Fig. 5. In this position the arm 88 will tend to pivot the bell crank 80 in a counterclockwise direction, which will force the link 82 to turn bracket 84 in a counterclockwise direction. This will force the aileron 11 in an upward direction and decrease the lift to counterbalance the additional air load on the wings.

In the modifications described coil springs 30 and 76 are sufficiently strong enough so as not to be affected by the operation of the normal aileron control. In this way the movement of the stick will operate the aileron control independent of the auxiliary aileron control.

Figure 7:
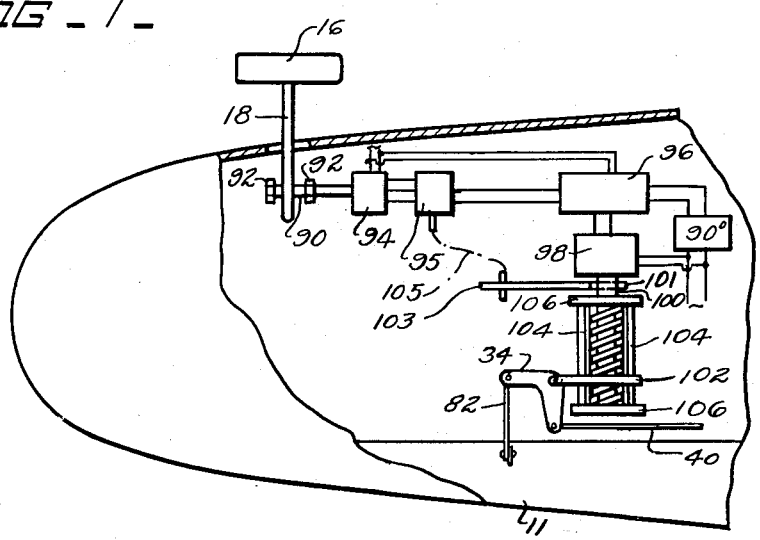
Figs. 7 and 8 show a wing having an electrical means of detecting and transmitting the effect of gust loads.
Figure 8:
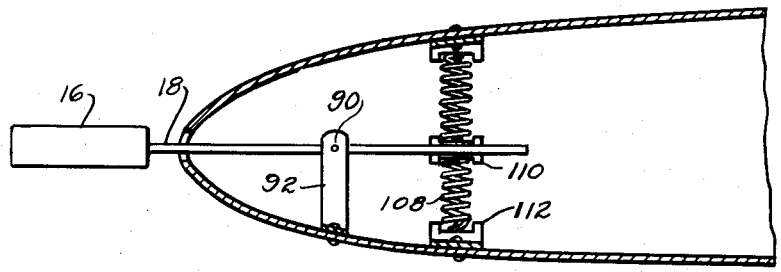

Referring to Figures 7 and 8, an electrical system is shown in combination with the airfoil. The airfoil 16 extends forward on the wing 10 and has an arm 18 connected thereto. The arm 18 is rigidly connected to a rod 90 which is pivotally mounted in brackets 92 which are connected to the structure of the wing. The rod 90 is also operably connected to selsyn pickoffs 94 and 95 which are in turn connected to a phase sensitive amplifier 96 which is in turn electrically connected to a two phase motor 98 which drives a worm 100. Reduction gears 101 and 103 are connected to worm 100. A shaft or coupling 105 connects the reduction gears to the selsyn 95. The worm 100 has a guide 102 threadedly mounted thereon. The said guide is mounted on guide shafts 104 which are in turn mounted in brackets 106 which are connected to the structure of the aircraft. The bell crank 34 is pivotally mounted on the guide 102. A rod 82 is pivotally connected to one end of the bell crank 34 and to the aileron 11. The other end of the bell crank 34 has a control rod 40 connected thereto. The arm 18 has spring seats 110 mounted thereon. Spring seats 112 are also mounted in the wing in alignment with spring seats 110 for carrying springs 108. The springs 108 keep the airfoil 16 in a neutral position until a sufficient predetermined airload is exerted on the airfoil, so that the normal aileron control may operate independently.

Upon movement of the airfoil 16, a signal will be transmitted to the selsyn pickoffs which will in turn be delivered to the phase sensitive amplifier which will energize the motor and turn the worm 100, whereupon the guide 102 will move in accordance therewith and transmit this motion to the bell crank 34 and rod 82, so that the aileron will be actuated. The selsyn pickoffs will tend to return the guide 102 to a neutral position after the gust load has been removed.

It is apparent that the specific embodiments shown above have been given by way of illustration and not by way of limitation and that the structures above described are subject to wide variation and modification without departing from the scope or intent of the invention, all of which variations and modifications are to be considered as equivalents and be included within the scope of the present invention.

I claim:

1. Gust alleviating means for aircraft wings, comprising in combination with an aircraft wing, an aileron pivotally mounted on said wing, a primary control system for actuating said aileron to vary the lift over the wing, a secondary control system for said aileron operable to actuate said aileron independent of actuation thereof by said primary aileron control system, gust detecting means comprising an auxiliary airfoil pivotally supported on said wing to be responsive to gust air loads acting on said wing, said primary control system comprising a bell crank pivotally and bodily shiftable in the wing, a control rod pivoted to one arm of said bell crank and adapted to pivot the bell crank about its center, and a link pivoted to the other arm of said bell crank, said link being pivotally connected to an operating arm bracket mounted on the aileron, said auxiliary airfoil extending outward in a spanwise direction from said wind and operatively connected to said bell crank center for bodily displacement of the bell crank pivot upon movement of said auxiliary airfoil, when said control rod is held stationary to rotate said bell crank about one arm pivot connection thereof to shift said link and said bracket to pivot said aileron, yielding means biasing said auxiliary airfoil to a neutral position until the air load thereon exceeds a predetermined value.

2. Gust alleviating means for aircraft wings, comprising in combination with an aircraft wing, an aileron pivotally mounted on said wing, a primary control system for actuating said aileron to vary the lift over the wing, a secondary control system for said aileron operable to actuate said aileron independently of actuation thereof by said primary aileron control system, said primary control system comprising a bell crank, a control rod pivotally connected to one end of said bell crank, and a link pivotally connected to the other end of said bell crank, said link being pivotally connected to a bracket mounted on said aileron, said secondary control system comprising an auxiliary air foil responsive to gust air loads extending outwardly in a spanwise direction from said wing, said auxiliary air foil being pivotally mounted in the wing and operatively connected to a piston rod, a piston fixed on said rod, a cylinder fixed in said wing surrounding said rod and piston, cylinder heads at the ends of said cylinder, said piston rod slidably extending through both ends of the cylinder heads with the piston fixed thereon between the cylinder heads, a pair of pistons slidably mounted on said rod, one on each side of the first mentioned piston for abutment with said fixed piston, an abutment in the cylinder intermediate the slidable pistons for limiting movement of each of the slidable pistons in an inward direction, a coil spring mounted between each of the cylinder heads and said sliding pistons for yieldingly holding said piston rod against longitudinal movement, one of said springs being compressed upon movement of said rod by said auxiliary air foil in one direction and the other by movement of the air foil in the opposite direction, said bell crank being pivotally mounted on said piston rod and operating by movement of said piston rod, said bell crank operating said link and bracket to pivot said aileron upon movement of said piston rod when said control rod is held stationary, said coil springs biasing said auxiliary air foil to a neutral position until air load thereon exceeds a predetermined value.

References Cited in the file of this patent

UNITED STATES PATENTS

| | | |
|---|---|---|
| 2,338,379 | Henke | Jan. 4, 1944 |
| 2,553,694 | Wendt | May 22, 1951 |
| 2,556,353 | White | June 12, 1951 |

FOREIGN PATENTS

| | | |
|---|---|---|
| 650,305 | Great Britain | Feb. 21, 1951 |